United States Patent Office 3,671,269
Patented June 20, 1972

3,671,269
PROCESS OF PREPARING PUDDINGS CONTAINING STARCH HAVING A LOW BOUND-FAT CONTENT
Felix J. Germino, Palos Park, and Joseph R. Caracci, Jr., Chicago, Ill., assignors to CPC International Inc.
No Drawing. Original application June 12, 1967, Ser. No. 645,527, now Patent No. 3,586,536. Divided and this application May 6, 1970, Ser. No. 47,931
Int. Cl. A23l 1/14
U.S. Cl. 99—139           4 Claims

ABSTRACT OF THE DISCLOSURE

Preparation of puddings by cooking together a mixture of milk, a sweetener, flavoring agent and starch, said starch being prepared by reducing the bound fat content of granular starch to not more than 0.15% by weight by heating a mixture of the starch, a suitable solvent, and not more than 15% water, in a confined zone, at from about 225° F. to about 300° F. for not more than 30 minutes, the conditions being selected so as to avoid incipient gelatinization of the starch. Starch treated in accordance with the process which is further characterized by a fluidity of from about 30 to about 80.

This application is a division of Ser. No. 645,527 filed June 12, 1967 now Pat. No. 3,586,536.

This invention relates to processes for treating granular, i.e. ungelatinized, starch in order to impart unique gelling properties to it. This invention also relates to products made from starch treated in accordance with the present invention; to processes for making gum confections from such treated starches; and to the gum confections made thereby.

It is an object of the present invention to prepare a granular starch product which will gelatinize to form exceptionally strong, firm, resilient gels.

A further object is to prepare a granular thin-boiling starch product which will set up to a firm, strong, gel in a remarkably short time.

Another object is to prepare a granular starch product which will gelatinize to form gels characterized by clarity, brilliance, and exceptionally bland taste.

An additional object is to prepare a granular thin-boiling starch product which, when used as the congealing agent in the production of gum confections, permits the production of such finished gum confections in an exceptionally short period of time.

A further object is to eliminate the lengthy conditioning period required in the conventional process of preparing gum confections.

Other objects and advantages will be apparent from a reading of the specification and claims.

It is known that amylose-containing cereal starches contain a certain amount of bound fat, usually about 0.5% to 0.8%; corn starch, for example, contains about 0.6% bound fat. Various methods have been used in the past to remove the major portion of this bound fat. It has recently been discovered that defatted thin-boiling starch, having a fat content of 0.3% or less, is an exceptionally fine congealing agent for use in the manufacture of various gelled food products, gum confections such as gum drops and jelly beans in particular.

We have now made the surprising discovery that amylose-containing cereal starches, that are characterized by a fat content of not more than 0.15%, and by the lack of or absence of incipient gelatinization (which will be defined hereinafter), exhibit unusually fine gelling properties. We have further discovered a simple, rapid and inexpensive method for preparing such starches. Starches treated by the process of the invention will, upon gelatinization, set up in a remarkably short time to firm, strong, resilient gels. These gels are further characterized by clarity and bland taste.

Briefly, the process is as follows. Granular starch is treated, in a confined zone, with a suitable solvent such as methanol or ethylene glycol monomethyl ether, the total starch-solvent system containing not more than about 15% moisture, and preferably not more than 12% moisture, by weight. The treatment takes place at a temperature from about 225° F. to about 300° F., preferably about 250° F. to about 275° F., for a time sufficient to reduce the fat content of the starch to 0.15% or less, the time not to exceed about 30 minutes.

Care must be taken to avoid incipient gelatinization of the starch during the treatment; by incipient gelatinization is meant that more than 2% of the starch granules have been damaged, i.e. have swollen hilums or complete loss of birefringence as viewed under a polarizing microscope. In order to avoid such incipient gelatinization the conditions of moisture content of the system and time and temperature of the treatment, which are interdependent, must be properly adjusted. This will be discussed fully hereinafter.

Any amylose-containing cereal starch, e.g. corn (maize), sorghum, wheat, rice, barley, or the like, is suitable for use in the invention. The starch may be unmodified (i.e. "thick-boiling"), or modified by acid or other known means to render it thin-boiling, prior to treatment. The ratio of starch to solvent is not critical, except obviously there must be sufficient solvent present to extract the bound fat. As a practical matter, for ease of handling, it is desirable to have the starch-solvent mixture in the form of a pumpable slurry; for this reason it is preferred to use at least about 1.6 parts solvent to 1 part of starch (parts by weight).

Higher ratios of solvent to starch can also be used, and often to advantage if the starch being treated initially contains a high proportion of water. As was stated previously, the total starch-solvent system should not contain more than about 15% by weight of water. If one is starting with, say, a wet starch filter cake containing about 40% water he can, of course, dry the starch prior to the treatment; alternatively, however, he can eliminate the drying step by employing an anhydrous or nearly anhydrous solvent in sufficient quantity to result in a total mixture containing 15% water or less.

The temperature of the treatment should be within the range of from about 225° F. to about 300° F.; a temperature of much below 225° F. will not reduce the fat content sufficiently even after 30 minutes, and a temperature of much above 300° F. results in incipient gelatinization even at extremely low water content.

The time of treatment at temperature should not exceed about 30 minutes, and, as a practical matter, should preferably be considerably less than 30 minutes.

The treatment should be conducted in a confined zone in order to maintain the solvent in a liquid state. Additional positive pressure could be employed, but is unnecessary to the efficient operation of the process.

Any suitable solvent, i.e. one which will reduce the fat content of the starch to 0.15% or less under conditions which will avoid incipient gelatinization, can be employed. Two solvents which we have found to be suitable are methanol and ethylene glycol monomethyl ether. We prefer to use methanol because it is readily available, inexpensive and is simple to remove from the starch after treatment. For some reason which cannot explain, many other readily available solvents such as ethanol, isopropanol, and acetone have been found to be inoperative for the process of the inevntion; this will be illustrated in an example.

There is an interrelationship among the water content of the system, the temperature of the reaction and the time of the treatment, which will now be discussed. As has been stated, it is essential to the invention that the starch be defatted to a level of 0.15% fat or less and incipient gelatinization of the starch must be avoided. An increase in any of the variables increases, up to a certain point, the fat removal, but also increases the danger of incipient gelatinization; therefore the conditions must be properly selected so as to avoid gelatinization while reducing the fat content to the required level. For example, if the maximum temperature and time of 300° F. and 30 minutes are employed, not more than about 2.5% water should be present in the system; if about 15% water is present in the system, a temperature of not more than 250° F. and a short treatment time (less than 10 minutes) should be employed. Selecting the proper conditions for the treatment is a relatively simple matter, and the examples to follow in the specification will serve as a guide in such selection.

After the treatment the solvent is removed from the starch, as by centrifugation or filtration. If a non-edible solvent such as methanol is employed, and if the starch is to be used in the preparation of food products, then of course substantially all of the residual solvent still present in the starch must be removed. It has been found that a considerable quantity of residual or "bound," solvent is retained by the starch even after repeated washings with water.

Any suitable process, which will effectively reduce the bound solvent to an acceptable level and which will not cause incipent gelatinization of the starch or otherwise have a deleterious effect upon the starch, can be employed for the removal of the bound solvent. We have found the following process to be particularly suitable for the desolventizing, in that it rapidly reduces the amount of bound solvent to an extremely low level without having any deleterious effect upon the properties of the starch.

The treated starch, which has been recovered from the liquid portion of the slurry, is first brought to a water content of not more than about 5%, and preferably not more than about 2.5% (by weight, based on the weight of the starch) and a total volatiles content of not more than about 35%, preferably not more than about 15%. This can be accomplished for example, by first washing the recovered starch with solvent or water, filtering, air-drying to a moisture content of about 8–12%, and finally drying with the application of heat (e.g. 245° F.–275° F.) to a moisture level of 5% or less and a total volatiles level of not more than 35%.

Live steam is then passed through the dried starch, the system being maintained at a temperature above the condensation point of the steam. A fluid bed apparatus is particularly suitable for performing this "steam desolventizing" process.

Bound solvent can be reduced to less than 50 p.p.m. in less than 60 minutes by the above described treatment.

Ordinary thick-boiling starches treated in accordance with the invention have a large number of uses, and can be used in any application wherein a starch having exceptionally high gel strength is desirable. They are particularly suitable as congealing agents for food products such as puddings, sauces, gravies, and the like. It is believed, however, that one of the most useful applications of the invention is in the area of manufacture of gelled food products such as gum confections. Starches used as congealing agents in gum confections are invariably rendered thin-boiling, i.e. modified by acid or other means to paste viscosities within the range of about 30 to about 80 fluidity (as measured by the method of Buel, 8th Intern., Congr. Pure Applied Chem. Orig., Comm., 13, 63 (1912)), to permit use of high starch solids in the gum confections. Therefore, when starch is treated in accordance with the invention for use in gum confections or the like, it should also be rendered thin-boiling, preferably within the range of 30 to 80 fluidity. This can be done before or after the defatting step.

In the conventional method of preparing gum confections such as gum drops a mixture of thin-boiling starch and a sugar solution such as sucrose, water and corn syrup is cooked in a steam injection cooker or heat exchanger. Flavoring and coloring are then added and the mixture is deposited into depressions of dry powdered molding starch in trays.

The trays are then stored in drying rooms (also called conditioning rooms) for about 1 to 3 days, during which time the candies gradually set up to firm gels which can be removed from the starch molds, "sanded" (i.e. given a coating of sugar), and packaged.

When conventional thin-boiling starches are used it usually takes about 24 hours for the gum drops to be firm enough to be removed from the molds without losing their shape, and an additional 24 to 48 hours (depending upon the temperature of the drying room) before they are sufficiently firm to be sanded.

When the starches of our invention are used as congealing agents for gum confection manufacture the need for drying rooms is completely eliminated; at ordinary room temperature, within about 30 minutes or less after the cooking operation, the candies are firm enough to be removed from the molds, and they are strong enough to be sanded within 60 minutes (usually within 45 minutes) after cooking. It should be noted that use of the starches of the invention requires no alternation in the normal process of gum confection preparation; conventional formulations, cooking processes and equipment can be used.

Confections prepared with the starches of the invention are comparable to those prepared with costly fruit pectin, in that they exhibit exceptional clarity and "brilliance" and have no undesirable "cereal" taste. They are further characterized by excellent resiliency, i.e. when subjected to pressure they will deform without cracking and when the pressure is removed they rapidly resume their former size and shape. Also the confections may be chewed without sticking to the teeth or gums which is a common characteristic of conventional gum confections.

The following examples will illustrate the practice of the invention. They are presented for illustrative purposes only, and should not be construed as limiting the scope of the invention in any way.

EXAMPLE I

This example illustrates the effect of varying temperatures, retention times, and water-contents of the system in the process. A series of runs was made using an acid modified thin-boiling corn starch (of 67 fluidity), which contained 0.56% bound fat, with methanol as the solvent. The starch was slurried with the solvent and placed in a confined zone, the temperatures raised to a specified point, held for a specified time in certain cases, and then brought back down to room temperature. The treatment conditions are set forth in Table I. In the case of samples 1 through 15, 3 minutes were required to bring the temperature up to that specified and 3 minutes required to bring the slurries down to room temperature; 30 minutes were required to bring samples 16, 17 and 18 to temperature and 20 minutes to cool them to room temperature; samples 19 through 25 were heated and cooled almost instantaneously (within about 40 seconds).

After treatment, pastes were prepared from some of the samples and the strength of the resultant gels was determined in the following manner. 15% starch pastes were prepared on a boiling water bath for 30 minutes with hand agitation for the first four minutes. After cooking, the pastes were poured into wide-mouth four-ounce jars and 3.5 ml. of paraffin oil placed over the surface to prevent shrinkage. The samples were held at room temperature, and tested on a Bloom gelometer (manufactured by Precision Scientific Co.) each hour over a period of four hours. The Bloom Gelometer values, in grams, are reported in Table I under the heading "Bloom Gel Strength."

A number of the samples were examined under a microscrope for granule damage, i.e. anything from a swelling of the hilums of the granules to a complete loss of birefringence. Incipient gelatinization was considered to be positive if more than 2% of the granules showed such damage.

Gum drops were prepared with the samples using the following procedure. A mixture of 1 lb. starch, 4 lbs. 9 ozs. corn syrup, 3 lbs. sucrose, and 1 lb. 1.5 oz. water was prepared, preheated to 226° F. and pumped through a precisely controlled laboratory size steam injection cooker under internal temperature conditions of 265° F. Immediately after cooking the hot mixture was spooned into starch molds and held at room temperature.

The candies were closely observed, and periodically removed from the molds, by persons will versed in the art of gum confection preparation. The time required for the candies to be sufficiently firm to be sanded, i.e. coated with sugar, was recorded and is given in Table I under the heading "Sanding Time." Also, the observers were asked to evaluate the samples using the designations "poor," "fair," "good," "excellent," "superior" and "very superior," based on a rating of "poor" for the untreated control. These ratings are given under the heading "Evaluation."

As can readily be seen from Table I, gum drops prepared from those starches which were defatted to 0.15% bound fat or lower and which further showed no incipient gelatinization could all be sanded within an hour or less (most could be sanded within 45 minutes or less) and were rated "excellent" or "superior" by the observers.

The interrelationship among the variables of water content and time and temperature of treatment can also be readily seen from Table I.

Several of the runs were subsequently repeated, substituting red milo starch (also known as non-waxy sorghum starch) for the corn starch. Identical results were obtained in all cases, indicating that the process of the invention is applicable to any starch which normally contains bound fat.

TABLE I

| Sample No. | Treatment conditions | | | | Characteristics of starches | | | | | | | Gum drop characteristics | |
|---|---|---|---|---|---|---|---|---|---|---|---|---|---|
| | Total H$_2$O in system, percent | Solvent/ starch ratio | Temperature (° F.) | Holding time (min.) | Fat content, percent | Scott viscosity (g./sec.) | Incipient gelatinization? | Bloom gel strength (gms.) after— | | | | Sanding time | Evaluation |
| | | | | | | | | 1 hr. | 2 hr. | 3 hr. | 4 hr. | | |
| Control [1] | 12 | | | | 0.56 | 50/63 | No | 109 | 239 | 292 | 300 | 48–72 hrs | Poor. |
| 1 | 5.25 | 1.6/1 | 170 | 0 | 0.36 | 50/61 | No | | | | | 48 hrs | Do. |
| 2 | 5.25 | 1.6/1 | 200 | 0 | 0.30 | 50/67 | No | | | | | 12 hrs | Fair. |
| 3 | 5.25 | 1.6/1 | 250 | 0 | 0.09 | 50/71 | No | | | | | 45 min | Superior. |
| 4 | 5.25 | 1.6/1 | 200 | 5 | 0.21 | 50/67 | No | | | | | 4 hrs | Good. |
| 5 | 5.52 | 1.6/1 | 250 | 5 | 0.06 | 60/85 | No | | | | | 45 min | Superior. |
| 6 | 5.25 | 1.6/1 | 170 | 10 | 0.25 | 50/65 | No | | | | | 6 hrs | Good. |
| 7 | 5.25 | 1.6/1 | 210 | 10 | 0.17 | 50/71 | No | | | | | 1.5 hrs | Very good. |
| 8 | 5.25 | 1.6/1 | 250 | 10 | 0.05 | 50/86 | No | | | | | 45 min | Superior. |
| 9 | 2.5 | 4.5/1 | 250 | 10 | 0.06 | 50/81 | No | 291 | 432 | 465 | 519 | 45 min | Do. |
| 10 | 15.0 | 5/1 | 250 | 10 | 0.06 | 50/145 | Yes | 264 | 321 | 389 | 359 | 12 hrs | Fair. |
| 11 | 0 | 2/1 | 250 | 10 | 0.08 | 50/86 | No | 290 | 466 | 498 | 541 | 45 min | Superior. |
| 12 | 0 | 5/1 | 250 | 10 | 0.07 | 50/87 | No | 281 | 441 | 495 | 544 | 45 min | Do. |
| 13 | 8.7 | 4.5/1 | 250 | 10 | 0.04 | 50/125 | No | | | | | 45 min | Do. |
| 14 | 2.9 | 4.5/1 | 250 | 10 | 0.04 | 50/107 | No | 309 | 457 | 498 | 530 | 45 min | Do. |
| 15 | 7.4 | 4.5/1 | 295 | 30 | 0.03 | 50/320 | Yes | 230 | 290 | 361 | 368 | 12–15 hrs | Fair. |
| 16 | 2.6 | 4.5/1 | 295 | 30 | 0.02 | 50/162 | No | 271 | 382 | 398 | 490 | 1 hr | Excellent. |
| 17 | 4.0 | 4.5/1 | 240 | 30 | 0.09 | 50/95 | No | 320 | 497 | 548 | 604 | 45 min | Superior. |
| 18 | 2.0 | 4.5/1 | 300 | 2 | 0.06 | 50/120 | No | 299 | 424 | 506 | 564 | 1 hr | Excellent. |
| 19 | 7.9 | 4.5/1 | 300 | 2 | 0.03 | 50/198 | Yes | 204 | 347 | 376 | 411 | 4 hrs | Good. |
| 20 | 13.6 | 4.5/1 | 300 | 2 | 0.06 | 30/67 | Yes | 137 | 184 | 208 | 216 | 16 hrs | Fair. |
| 21 | 2.9 | 4.5/1 | 250 | 2 | 0.05 | 50/69 | No | 382 | 560 | 673 | >690 | 30 min | Superior. |
| 22 | 7.0 | 4.5/1 | 250 | 2 | 0.04 | 50/73 | No | 384 | 518 | 587 | 561 | 30 min | Do. |
| 23 | 11.0 | 4.5/1 | 250 | 2 | 0.05 | 50/90 | No | 311 | 498 | 523 | 651 | 35 min | Do. |
| 24 | 15.1 | 4.5/1 | 250 | 2 | 0.07 | 50/102 | No | 308 | 450 | 491 | 506 | 1 hr | Excellent. |

[1] 67 fluidity corn starch.

EXAMPLE II

This example illustrates the use of other common and commercially available solvents for the defatting of starch. Example I was repeated, except that methyl Cellosolve (ethylene glycol monomethyl ether), ethanol, denatured ethanol, isopropanol and acetone were used as solvents. The treatment conditions, data on the resultant starches, and characteristics of gum drops prepared from the starches, are given in Table II. In addition to the data presented in Table I of the previous example, the "gel times," i.e. the time required for the gum drops to be sufficiently firm to be removed from the molds, are reported in Table II.

In all cases, the starches were brought to the specified temperature in 3 minutes, held for 10 minutes, and brought down to room temperature in 3 minutes. A solvent/starch ratio of 1.6/1 was used throughout.

In order to facilitate comparison, the data for the untreated control and for samples 6, 7 and 8 from Example I are repeated in Table II.

As can be seen from the data in Table II, methyl Cellosolve produced a very quick-gelling starch which performed in a superior manner in the manufacture of gum drops. However, the other solvents tested resulted in, depending upon the process conditions used, either insufficient reduction of the fat content of the starch or incipient gelatinization of the starch. Therefore, ethanol, isopropanol and acetone are considered to be inoperable in our invention.

TABLE II

| Sample No. | Treatment conditions | | | Characteristics of starches | | | Gum drop characteristics | | |
|---|---|---|---|---|---|---|---|---|---|
| | Solvent used | Total H₂O in system, percent | Temperature (° F.) | Fat content, percent | Scott viscosity (g./sec.) | Incipient gelatinization? | Gel time | Sanding time | Evaluation |
| Control | | 12 | | 0.56 | 50/63 | No | 24 hrs | 48–72 hrs | Poor. |
| 6 | Methanol | 5.25 | 170 | 0.25 | 50/65 | No | 2 hrs | 6 hrs | Good. |
| 7 | do | 5.25 | 210 | 0.17 | 50/71 | No | 40 min | 1.5 hr | Very good. |
| 8 | do | 5.25 | 250 | 0.05 | 50/86 | No | 10 min | 45 min | Superior. |
| 25 | Methyl Cellosolve | 5.25 | 250 | 0.12 | 50/70 | No | 15 min | 45 min | Do. |
| 26 | Ethanol | 5.25 | 178 | 0.47 | 50/64 | No | 24 hrs | 48–72 hrs | Poor. |
| 27 | do | 5.25 | 200 | 0.43 | 50/62 | No | 24 hrs | 48–72 hrs | Do. |
| 28 | do | 5.25 | 250 | 0.25 | 50/75 | No | 2 hrs | 6 hrs | Good. |
| 29 | do | 14.5 | 250 | 0.07 | 28.35/46 | Yes | 2 hrs | 6 hrs | Do. |
| 30 | Denatured ethanol | 5.25 | 250 | 0.26 | 50/75 | No | 2 hrs | 6 hrs | Do. |
| 31 | do | 14.1 | 250 | 0.09 | 50/120 | Yes | 2 hrs | 6 hrs | Do. |
| 32 | Isopropanol | 5.25 | 183 | 0.54 | 50/58 | No | 24 hrs | 48–72 hrs | Poor. |
| 33 | do | 5.25 | 210 | 0.56 | 50/57 | No | 24 hrs | 48–72 hrs | Do. |
| 34 | do | 5.25 | 250 | 0.56 | 50/62 | No | 24 hrs | 48–72 hrs | Do. |
| 35 | do | 5.25 | 275 | 0.54 | 50/66 | No | 24 hrs | 48–72 hrs | Do. |
| 36 | do | 11.3 | 250 | 0.29 | 50/78 | No | 2 hrs | 6 hrs | Good. |
| 37 | do | 20.0 | 250 | 0.06 | 25/51 | Yes | 24 hrs | 48–72 hrs | Poor. |
| 38 | Acetone | 5.25 | 250 | 0.53 | 50/75 | No | 24 hrs | 48–72 hrs | Do. |
| 39 | do | 20.0 | 250 | 0.10 | 28.35/46 | Yes | 2 hrs | 6 hrs | Good. |

EXAMPLE III

In the previous examples, thin-boiling starch of 67 fluidity was used as the starting material for the defatting process; in this example unmodified, thick-boiling corn starch was first defatted and then rendered thin-boiling.

The defatting process was conducted in an autoclave at 250° F. The samples were not held at 250° F., but were merely brought up to temperature within 3 minutes and immediately brought back down to room temperature within another period of 3 minutes. The conditions of water content in the system and solvent/starch ratio are given in Table III. The fat content of the thick-boiling starches was less than 0.1% after the defatting step.

Following the defatting step, the starches were rendered thin-boiling by modification at 128° F. with sulfuric acid at an acid titer of 33 to 34 ml. for about 6 hours. The Scott viscosities and Bloom gel strengths of the starches are reported in Table III.

Gum drops were prepared as before, and their characteristics are also reported in Table III. Furthermore, the resiliency of the finished gum drops was tested, after 72 hours, by first measuring the height of the confection, then placing a 1,000 gm. weight on the gum drop and letting it set for 5 minutes, then removing the weight and measuring the height of the gum drop 5 minutes after removal of the weight. The percent recovery of the original height is reported in Table III.

TABLE III

| Sample No. | Control | 40 | 41 |
|---|---|---|---|
| Defatting treatment: | | | |
| Total H₂O in system, percent | 12 | 5.2 | 7.5. |
| Solvent/starch ratio | | 1.6/1 | 4.5/1. |
| Properties after modification: | | | |
| Scott viscosity (g./sec.) | 50/63 | 50/77 | 50/94. |
| Bloom gel strength after— | | | |
| 1 hr | 109 | 293 | 322. |
| 2 hrs | 239 | 470 | 443. |
| 3 hrs | 292 | 525 | 508. |
| 4 hrs | 300 | 554 | 515. |
| Gum drop characteristics: | | | |
| Gel time | 24 hrs | 30 min | 10 min. |
| Sanding time | 48–72 hrs | 35 min | 15 min. |
| Resiliency (percent recovery) | 42.5 | 76.3 | 78.3. |
| Evaluation | Poor | Superior | Very superior. |

EXAMPLE IV

This example illustrates the effect of blending the novel starches of our invention with ordinary thin-boiling starch. Blends of samples 17 and 21 with regular thin-boiling starch (the same which was used as the control in the previous examples) were prepared. The data on these blends, and on gum drops prepared from them, are given in Table IV. For purposes of comparison, data on the control and samples 17 and 21 are also given in Table IV.

TABLE IV

| Percent by weight | | | Characteristics of starches | | | | | Gum drop characteristics | | | |
|---|---|---|---|---|---|---|---|---|---|---|---|
| Control | Sample 17 | Sample 21 | Total fat content, percent | Bloom gel strength (gms.) after— | | | | Gel time | Sanding time | Resiliency (percent recovery) | Evaluation |
| | | | | 1 hr. | 2 hr. | 3 hr. | 4 hr. | | | | |
| 100 | 0 | 0 | 0.56 | 109 | 239 | 292 | 300 | 24 hrs | 48–72 hrs | 42.5 | Poor. |
| 0 | 100 | 0 | 0.09 | 320 | 497 | 548 | 604 | 10 min | 45 min | 65.0 | Superior. |
| 0 | 0 | 100 | 0.05 | 382 | 560 | 673 | >690 | 15 min | 30 min | 68.8 | Do. |
| 12.7 | 87.3 | 0 | 0.15 | 200 | 406 | 460 | 528 | 15 min | 45 min | 63.0 | Do. |
| 23.4 | 76.6 | 0 | 0.20 | 284 | 441 | 464 | 534 | 40 min | 3 hrs | 59.1 | Good. |
| 50 | 0 | 50 | 0.30 | 315 | 448 | 484 | 462 | 2 hrs | 6 hrs | 45.0 | Do. |
| 40 | 0 | 60 | 0.25 | 283 | 452 | 473 | 523 | 1 hr | 4 hrs | 50.0 | Do. |

EXAMPLE V

This example illustrates the use of starch treated in accordance with the process of the invention, which is not rendered thin-boiling prior to or subsequent to the treatment, in the manufacture of puddings.

Unmodified, thick-boiling corn starch was slurried with methanol, the solvent/starch ratio being 1.6/1 and the total content of the system being 5.25%. The slurry was placed in a confined zone and brought to a temperature of 250° F., over a period of 3 minutes, held at that temperature for 10 minutes, and brought back to room temperature over a period of 3 minutes.

The treated starch had a fat content of 0.07%; no incipient gelatinization was observed.

Four batches of vanilla pudding were prepared, 2 using the untreated starch and 2 using the treated starch, by the following procedure:

| Ingredients: | G. |
|---|---|
| Starch, D.B. | 13.0 |
| Sucrose | 36.2 |
| Dextrose | 9.0 |
| Salt | 0.3 |
| Flavoring | 0.17 |
| Color | 0.5 |
| Milk—237 ml. (1 cup) | |

The ingredients were mixed and cooked for a period of 7 minutes on a boiling water bath, stirring the mixture for the first 2 minutes. The hot puddings were poured into standard size dishes and cooled for 3 hours at 40° F. At the end of this time the gel strength was measured with a Bloom gelometer. The data are presented in Table V.

TABLE V

| Starch used | Gel strength (gms.) | Body | Flavor |
|---|---|---|---|
| Untreated | 42.6 | Good | Good. |
| Do | 49.2 | ...do | Do. |
| Treated | 77.0 | ...do | Excellent. |
| Do | 75.4 | ...do | Do. |

As can be seen from Table V, the puddings prepared from the treated starch had substantially higher gel strengths than those prepared from ordinary starch. The flavor of these puddings was also better, probably because the process of the invention removes proteinaceous and lipid materials thus producing a more bland tasting starch.

Other puddings were then prepared with the treated starch, using 8–10% less starch than previously (otherwise the recipes were identical). These puddings had gel strengths of the same order as the puddings prepared with 13.0 gms. of ordinary, untreated, starch, and their flavor was superior to those prepared with the untreated starch.

EXAMPLE VI

This example illustrates our preferred method for desolventizing, i.e. removing substantially all of the "bound," or retained, solvent from, the starch treated in accordance with the invention.

As was stated previously, a certain amount of solvent is retained by the starch after treatment even after repeated washings with water. If the starch is to be used in the preparation of food products the bound solvent level must be brought to an acceptably low value, i.e. below 300 p.p.m.

Various methods of desolventizing the starch are available, and any method which will effectively reduce the amount of retained solvent without adversely affecting the starch (such as causing incipient gelatinization) can be employed. We are presenting our preferred method of desolventizing in this specification because we find it to be an extremely efficient process and one which affords a high degree of control.

Acid modified corn starch (67 fluidity) was treated in accordance with the invention, methanol being used as the solvent. After treatment the starch was filtered out of the slurry and washed with fresh methanol. A portion, designated as the control, was used in the preparation of gum drops; the gum drops could be sanded 45 minutes after deposit in the molds.

Other portions of the starch were then placed in a jacketed fluid bed drier and dried to varying contents of water and total volatiles, which values are reported in Table VI. The samples were then desolventized by passing live steam through the starch for a period of 60 minutes, while maintaining the jacket temperature above the condensation temperature of steam. (If the temperature falls below that point, gelatinization of the starch occurs.) The methanol content of all the samples was less than 50 p.p.m. after desolventizing.

The desolventized starches were then used in the preparation of gum drops. The sanding times of the gum drops are reported in Table VI.

TABLE VI

| Sample number | Jacket temperature (° F.) | Initial H₂O content, percent | Sand time of candy (minutes) |
|---|---|---|---|
| Control | | | 45 |
| 42 | 275 | 2.1 | 45 |
| 43 | 245 | 2.2 | 45 |
| 44 | 275 | 2.7 | 50 |
| 45 | 245 | 3.2 | 55 |
| 46 | 145 | 6.0 | 65 |

| Sample number | Jacket temperature (° F.) | Initial volatiles content, percent | Sand time of candy (minutes) |
|---|---|---|---|
| 47 | 250 | 12 | 45 |
| 48 | 250 | 15 | 45 |
| 49 | 250 | 18 | 50 |
| 50 | 250 | 20 | 50 |
| 51 | 250 | 40 | 65 |

As can be seen from Table VI, the best results are obtained when the starch, prior to desolventizing, is brought to a water content not in excess of 2.5% and a total volatiles content of not in excess of 15%. Gum drops prepared from samples 44, 45 and 46 (which contained more than 2.5% water) and 49, 50 and 51 (which contained more than 15% total volatiles) had longer sanding times than the control, indicating that some granule damage had occurred. It should be noted, however, that all of the desolventized samples have extremely short standing times. We have concluded that as a practical matter the starch should not contain more than about 5.0% water and not more than about 35% total volatiles when contacted with the steam. Preferably, the water content should not be more than 2.5% and the total volatiles content not more than 15%, because under these conditions no observable change in the properties of the starch occurs; however, the higher water and volatiles contents can be tolerated as they cause relatively insignificant granule damage.

Samples 42 and 43 illustrate that the temperature of the desolventizing process is not critical, provided, as stated before, the temperature is high enough to avid condensation of the steam.

Additional runs were made, in which the time of treatment was varied from 30 minutes to 2 hours and longer. It was found that 30 minutes was adequate to reduce the methanol content to less than 50 p.p.m.; it was also noted that extended periods of time, although unnecessary for the effective removal of solvent, did not result in any damage of the starch.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A process for preparing a pudding comprising cooking a mixture of milk, a sweetening agent, a flavoring agent, and a starch, for a time sufficient to gelatinize said starch, said starch being present in an amount sufficient to congeal the pudding said starch having been prepared in accordance with the following process:
   (a) mixing a granular starch which contains a normal amount of bound fat with a solvent for said bound fat, the resultant mixture containing not more than about 15% of water based on the weight of the total mixture, and
   (b) heating said mixture in a confined zone at a temperature of from about 225° F. to about 300° F., for a time sufficient to reduce the bound fat content of said starch to not more than 0.15%, said time being not in excess of 30 minutes,
   the selection of the solvent and the conditions of water content of the starch-solvent mixture, the temperature of treatment, and the time of treatment being such as to avoid incipient gelatinization of the granular starch,
   (c) recovering the treated starch from the liquid phase of the system, and
   (d) reducing the amount of solvent present in the recovered starch to less than 300 parts per million, by weight, based on the weight of the starch.

2. The process in accordance with claim 1, wherein the solvent present in the recovered starch was reduced by:
   (a) first bringing the recovered starch to a moisture content of not more than about 5% and a total volatiles content of not more than about 35%, percentages by weight based on the weight of the starch, and then (b) contacting the resultant starch with live steam, at a temperature high enough to avoid condensation of the steam, for a time sufficient to reduce the amount of solvent present in the starch to less than 300 parts per million.

3. A process for preparing a pudding comprising cooking a mixture of milk, a sweetening agent, a flavoring agent, and a starch, for a time sufficient to gelatinize said starch, the starch being present in an amount sufficient to congeal the pudding said starch having been prepared in accordance with the following process:

heating, in a confined zone, a slurry of
  granular starch which contains a normal amount of bound fat,
  methanol, and from 0% to about 12% by weight, based on the weight of the slurry, of water
at a temperature of from about 250° F. to about 275° F. for not more than about 30 minutes,
  the time of heating being sufficiently long to reduce the fat content of the starch to not more than 0.15%,
  and sufficiently short so as to avoid incipient gelatinization of the starch, recovering the treated starch from the liquid phase of the slurry, and reducing the amount of methanol present in the recovered starch to less than 300 parts per million, by weight, based on the weight of the starch.

4. The process in accordance with claim 3, wherein the methanol present in the recovered starch was reduced by:

(a) first bringing the recovered starch to a moisture content of not more than about 5% and a total volatiles content of not more than about 35%, percentages by weight based on the weight of the starch, and then (b) contacting the resultant starch with live steam, at a temperature high enough to avoid condensation of the steam, for a time sufficient to reduce the amount of methanol present in the starch to less than 300 parts per million.

References Cited
UNITED STATES PATENTS 3,446,628  5/1969  Schoch et al. _____ 99—134

RAYMOND N. JONES, Primary Examiner

J. M. HUNTER, Assistant Examiner